United States Patent [19]

Chiba et al.

[11] Patent Number: 5,266,860
[45] Date of Patent: Nov. 30, 1993

[54] COMMUTATOR

[75] Inventors: Akio Chiba, Hitachi; Masahisa Sobue, Mito; Kazuo Tahara; Nobuyuki Yamashita, both of Hitachi; Shun Suzuki, Katsuta, all of Japan

[73] Assignee: Hitachi, Ltd., Tokyo, Japan

[21] Appl. No.: 852,579

[22] Filed: Mar. 17, 1992

[51] Int. Cl.$^5$ .................................. H02K 13/00
[52] U.S. Cl. ................................ 310/233; 310/45; 310/220; 310/235
[58] Field of Search ............... 310/233, 234, 235, 236, 310/237, 51, 220, 221, 45, 72; 318/439

[56] References Cited

U.S. PATENT DOCUMENTS

| 1,255,681 | 2/1918 | Zenk | 310/233 |
|---|---|---|---|
| 1,393,878 | 10/1921 | Apple | 310/233 |
| 3,487,248 | 12/1969 | Kaneko | 310/220 |
| 3,488,538 | 1/1970 | Hayashi | 310/220 |
| 3,594,598 | 10/1969 | Schaub | 310/220 |
| 3,777,367 | 12/1973 | Kalagidis | 310/234 |
| 4,603,474 | 8/1986 | Gobrecht | 310/233 |
| 4,833,357 | 5/1989 | Tamura | 310/221 |
| 4,845,395 | 7/1989 | Bost | 310/233 |
| 4,868,440 | 9/1989 | Gerlach | 310/236 |
| 4,881,000 | 11/1989 | Wang | 310/234 |
| 5,003,212 | 3/1991 | Ibe | 310/235 |
| 5,008,577 | 4/1991 | Wang | 310/233 |
| 5,124,604 | 6/1992 | Nagasaka | 310/233 |

FOREIGN PATENT DOCUMENTS

| 9189 | 2/1980 | Japan . |
|---|---|---|
| 9197 | 2/1980 | Japan . |
| 9199 | 2/1980 | Japan . |
| 15945 | 4/1980 | Japan . |
| 3905 | 1/1981 | Japan . |
| 55630 | 12/1983 | Japan . |
| 34056 | 8/1984 | Japan . |
| 34057 | 8/1984 | Japan . |
| 32548 | 2/1985 | Japan . |
| 252973 | 10/1988 | Japan . |

OTHER PUBLICATIONS

Patent Abstracts of Japan vol. 4, No. 71 (E-012) May 24, 1980 & JP-A-55 041 177 (Matsushita Electric Works Ltd.) Mar. 22, 1980.

*Primary Examiner*—R. Skudy
*Attorney, Agent, or Firm*—Antonelli, Terry, Stout & Kraus

[57] ABSTRACT

A commutator has a central support supporting a plurality of conductive segments separated by a plurality of insulative segments. In addition to providing an insulative function between the conductive segments, the dielectric constant, the area, and the thickness of the insulative segments are chosen so that they provide a capacitive effect, which capacitive effect suppresses current peaks during operation of the commutator. Preferably, the dielectric constant is greater than 10. The central support may include a metal shaft and an insulating ring, which insulating ring is preferably of material with a lower dielectric constant thereby to suppress-shorting between the shaft and the conductive segments. It is particularly advantageous if the conductive and insulative segments are of ceramics material since this provides good wear resistance. In further alternatives, capacitors are formed between the conductive segments by rings or other bodies of insulative materials of a suitably high dielectric constant.

21 Claims, 11 Drawing Sheets

Segment cycle

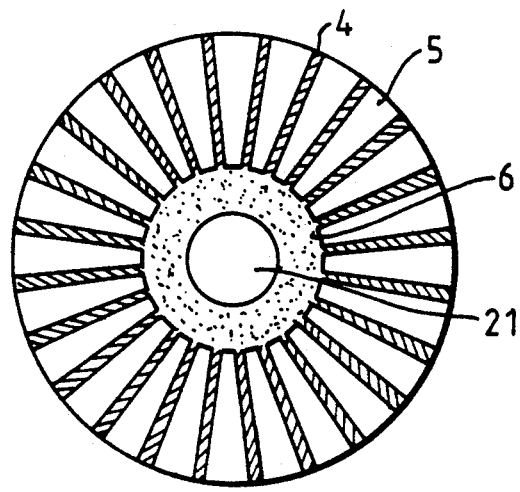
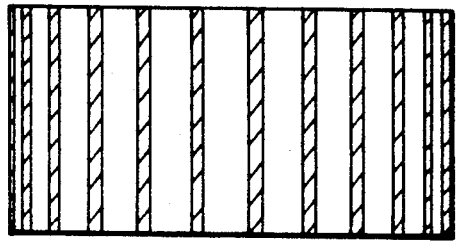
FIG. 6
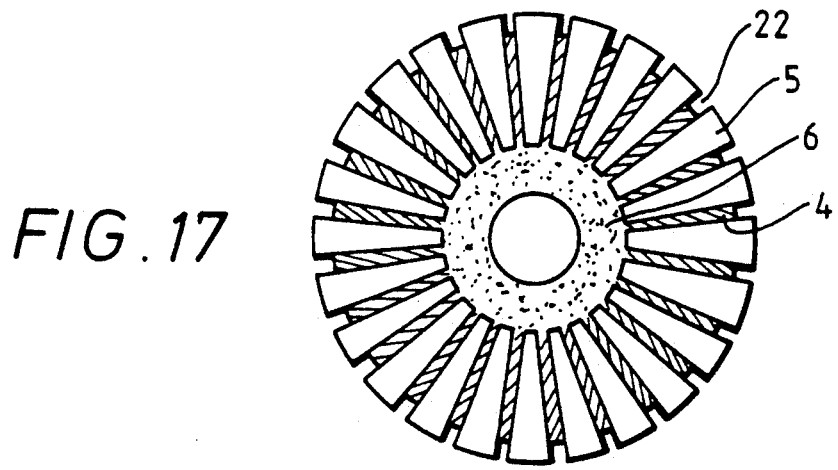
FIG. 17
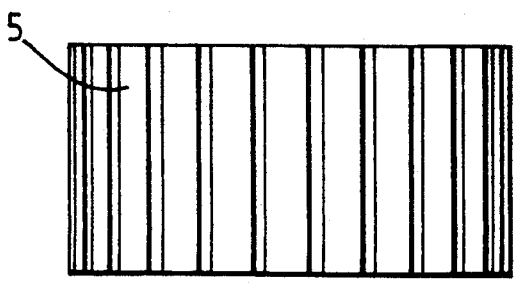

COMMUTATOR

BACKGROUND OF THE INVENTION

1. Filed of the Invention

The present invention relates to a commutator. Such a commutator may be used, for example, in a rotating machine such as an electric motor or generator.

2. Summary of the Prior Art

A commutator is an important component of a rotating machine, and comprises a rotating body with conductive parts (normally segments) which are connected to armature windings of the machine. Brushes pass over the surface of the commutator. Each time a coil of the armature winding is short-circuited by a brush, one brush allows the current to flow from positive to negative polarities and another brush allows current to flow in the reverse direction, from negative to positive polarity. The current flow begins at the instant that the coil is short-circuited by the brush and terminates when the short-circuit is broken. This process is completed in a very short time and repeated continuously to achieve rectification.

The current flowing in a short-circuited coil during the rectification has an increased rate of change when rectification starts or terminates, and a spark is likely to occur between the commutator and brush. Such a rectification spark occurs when the brush contact voltage drop exceeds a specific voltage. The rectification spark is small when there is a low brush contact voltage drop when rectification terminates, and may result in arc discharge when the voltage drop is high. If arc discharge occurs, a high temperature spot may be produced on the brush, so that abnormal abrasion may be caused in and by the brush and the commutator may partially soften. This produces a large number of carbon particles and ionizes air, thereby inducing the danger of flashover.

Additionally, sparks occurring on rectification may result in electric noise regardless of the spark size. This noise induces radio disturbance, causing noise in TV and radio at home (ghost lines or interference voice for TV) and errors in computers.

In order to suppress noise, it has been proposed to connect capacitors between adjacent conductive segments of the commutator, which capacitors inhibit peak currents, and therefore inhibit sparks. There have been many proposals for a configuration of such capacitors, including JP-A-55-15945, JP-A-58-55630, JP-A-59-34056, JP-A-59-34057, JP-A-60-32548, JP-A-55-9197, JP-A-55-9198, JP-A-55-9199, and JP-A-56-3905. In all the above proposals, the capacitor has been a separate component.

It should also be noted that it has been proposed to form a commutator of ceramic material, with the alternate conductive and insulative segments of the capacitor being of different ceramic material. An example of this is JP-A-63-252973 which will be discussed in more detail later. For the sake of completeness it is also mentioned that many different ceramics are known, with different electrical properties, the importance of which will again be discussed later.

SUMMARY OF THE PRESENT INVENTION

As was mentioned above, previous proposals for forming capacitors between the conductive segments of a commutator have proposed that the capacitors are separate. According to a first aspect of the present invention, it is proposed that the material of the insulative segments is chosen to give an appropriate capacitive effect, by suitable choice of the dielectric constant thereof, the area thereof in a plane radial to the commutator, and the thickness thereof in the circumferential direction of the commutator. Thus, the need for separate capacitors is eliminated, since a capacitor is formed between adjacent conductive segments by the material of the intervening insulative segment. The capacitor formed by each insulative segment then suppresses current peaks Preferably, the dielectric constant of the insulative segment is greater than 10, preferably greater than 20. Indeed the use of insulative segments of such dielectric constant represents a second, independent, aspect of the present invention.

The capacitance of a capacitor is directly proportional to its dielectric constant and inversly proportional to its thickness. Therefore, at first glance, it would seem possible to provide a suitable capacitance between the insulative segments with a material of low dielectric constant if the thickness of the insulative segment was sufficiently small. However, it must be remembered that the insulative segments must also carry out their primary function of providing insulation between the conductive segments, and if the insulative segments were too thin, the insulative effect thereof could weaken, thereby preventing operation of the capacitor. Therefore, in practice, a minimum thickness is necessary, which minimum thickness depends on the nature and operating conditions of the machine in which the commutator is to be used. Furthermore, it is not always desirable for the capacitance of the insulative segments to be too high, since this may also interfere with successful operation of the commutator. There is no easy way by employing theory alone to obtain the values of suitable capacitance, and the particular values of the dielectric constant, the area, and the thickness of the insulative segments according to the present invention must be determined on a case-by-case basis, according to the purpose of the commutator.

A commutator rectifies by maintaining mechanical and electrical contact between the outer surface thereof and the brush. Thus, the surface of the commutator must be smooth, without roughness, so that the sliding contact with the brush is stable. However, the temperature of the commutator rises due to abrasion due to sliding during rectification, and sparks accompany rectification, so that the commutator may be deformed by heat or centrifugal force caused by high-speed revolution. This problem is particularly serious because individual rectifying elements normally held together by resin, particularly in the case of a molded commutator, and the uneven filling of resin or the reinforcement material may occur, so that the displacement of each conductive segment of the commutator may be unequal. A step difference occurring from a difference in height is then likely to occur between neighboring conductive segments so that the surface of the commutator loses its intended smoothness. This tendency becomes more evident as the rotation speed increases so as to prevent the secure sliding contact of the brush and to worsen the characteristics of rectification. Consequently, the chances of rectifying sparks between the brush and commutator progressing increase so that the loss and abrasion of the commutator and brush surfaces increase thereby reducing the service life of the machine, and sometimes damaging the commutator.

Therefore, as mentioned earlier, it has been proposed to use ceramic material and in particular conductive ceramic and insulating ceramic to form the conductive segments and insulative segments.

A ceramic commutator can be produced by a reactive sintering method using conductive ceramic and insulating ceramic. This production method can produce a ceramic commutator with variable resistance of the ceramics for which the dimensional change due to sintering is small. Additionally, by adjusting the amount of material to be added, the coefficients of thermal expansion of the conductive ceramic and insulated ceramic can be matched, so that integral sintering of the conductive material and the insulating material is possible.

In JP-A-63-252973, however, the problem of noise due to sparks was not considered, and therefore the only property considered when selecting the material to form the insulative segments was the insulating property thereof. Therefore, the capacitance thereof was not considered, and in JP-A-63-252973, the dielectric constant of the insulative segments was less than that required by the present invention. However, because of the advantages discussed above, it is preferable that the conductive and/or the insulative segments of a commutator according to the present invention are made of a ceramic material. Many different ceramic materials are known, of different dielectric constants and it is possible to select a suitable mixture of such materials in order to achieve insulative segments with the properties required by the present invention. In particular, ceramic materials including $TiO_2$ and $Ba\ Ti_xO_y$ are particularly suitable. Of course, many other materials may be used in the present invention.

Normally, in a commutator, the conductive and the insulative segments are mounted on a central support, which normally includes a metal shaft and is therefore conductive. The conductive segments need to be insulated from that shaft, and, in JP-A-63-252973, insulating material of the same insulative material as the material of the insulative segments surrounded the shaft. It would be possible to apply this concept to the present invention, but it is thought that a problem would then result. When the commutator is operating, there is a fluctuating voltage between the central shaft and the conductive segments. which this fluctuating voltage may have high frequency ripples therein. Such high frequency ripples therefore appear across the insulating part of the central support If this were to happen, and insulating part had a sufficiently high capacitance, then an alternating current could pass therethrough, resulting in shorting of the conductive segments to the central shaft. Therefore, it is desirable that the insulating part of the central support has little or no capacitive effect, and therefore it is desirable that the insulating part of the central support is formed from a different material from the conductive segments of the first and second aspects of the present invention. Indeed, the use of a different material represents a third aspect of the invention, which may be independent or may be used in combination with either or both of the first two aspects.

The material of the insulative segments preferably has a dielectric constant greater than 10, more preferably at least 20. The insulative segments then form the capacitors between the conductive segments, in order to suppress current peaks. Then, the insulating material of the central support may have a smaller dielectric constant, and also may have a greater resistivity.

It is also possible for the insulating material of the central support to have a higher dielectric constant, which gives a further effect which will be discussed subsequently.

A further development of the present invention makes use of the realization that use of insulative material which has a sufficient dielectric constant, and thereby provides suitable capacitance, may be employed in a commutator without the capacitive effect necessarily being provided by the insulative segments.

It has already been mentioned, when referring to the third aspect of the present invention, that the central support may be of insulating material. This third aspect was derived to prevent shorting between the central shaft and the conductive segments, but it also can be seen that that insulative material interconnects the conductive segments. Therefore, if that material has a sufficiently high dielectric constant, it may provide suitable capacitive effect. The material giving that capacitive effect may be part of the central support, in which case it may be necessary to provide further insulation (not shown) between that material and the shaft to prevent shorting, but may be any body of suitable material interconnecting the plurality of conductive segments. The use of an interconnecting body represents a fourth, independent, aspect of the present invention.

The body may be a ring (not shown) inward of the conductor segments, as described earlier, but may be a radially outward ring or a plate axial of the plurality of conductive segments. In each case, the body physically interconnects the conductive segments, and its dielectric constant is such as to form capacitors between the adjacent conductive segments for suppressing current pulses.

Many different combinations of the above aspects may be provided. For example, the third and fourth aspects may be combined by forming the insulating material of the central support of material with a sufficiently high dielectric constant that it forms the capacitors, and then forming the insulative segments of material with a lower dielectric constant (therefore the insulative segments are of different material than the insulating material of the central support). As a further alternative, the first, second and fourth aspects may be combined by providing insulative segments for suitably high dielectric constant, and a body interconnecting the conductive segments of suitably high dielectric constant. The body and the insulative segments may then be of the same material.

To form conductive ceramic for use in the present invention, metallic Si (silicon) powder and a conductive ceramics powder may be used, to form a insulating ceramic, metallic Si powder and insulating ceramic powder or ceramic powder having a larger dielectric constant may be used. When such powders are heated in nitrogen gas, Si reacts with $N_2$ so as to produce $Si_3N_4$ (silicon nitride) so that $Si_3N_4$ combined conductive/insulating ceramic sintered substance is formed.

The resistivity of the ceramic can be selected over a range from $10^{-5}$ μm to $10^{12}$ μm, and therefore permit suitable resistivities for the material of all parts of the commutator. The insulating material of the central support has a resistivity greater than a resistivity of the material of the insulative segments. The dimensional change rate when sintering conductive and insulating ceramic may be as small as 0.3% because when a sintered substance is formed Si reacts with $N_2$ so as to produce $Si_3N_4$ thereby filling molding cavities. The coefficients of thermal expansion of $Si_3N_4$ combined conductive ceramic and insulating ceramic can be changed from the coefficient to thermal expansion of $Si_3N_4$ to that of an added element arbitrarily so that the conditions for integral sinter ("cofiring") of conductive and insulating material may be satisfied. Thus, even if conductive material is integrated with insulating material, a sintered substance having no risk of cracking or glazing upon sintering can be obtained by equalizing the coefficients of thermal expansion.

Even when the commutator is heated during operation, no roughness is produced on the surface of the commutator so that the surface of the commutator in a sliding contact is kept smooth so as to ensure an excellent rectification because the coefficient of thermal expansion of the conductive material is consistent with that of the insulating material.

$Si_3N_4$ material has a dielectric characteristic, and, by adding ceramic powder having a higher dielectric constant as additive, a capacitor with a large capacitance may be obtained so to inhibit the generation of a spark in the rectification cycle as discussed earlier.

On the other hand, in order to join a conductor with an insulator, the ceramic commutator may use a ceramic base bond. The ceramic bonding material is one whose main component is a ceramic that has the same coefficient of thermal expansion as the conductor and insulator used. The binder to be used in the bond is removed at 300° to 500° C., and at that time, the main component, ceramic is hardened. The temperature of heat resistance is over 1000° C. The coefficients of thermal expansion of bond and the ceramic can be equalized by selecting the components of the ceramic material which is the main component of bond.

A commutator according to the present invention using ceramic for its conductive segment and a ceramic capacitor having an insulation characteristic for its insulating segment does not exhibit glazing or cracking even if heated during operation because the coefficients of thermal expansion of the materials used may be the same. Hence an excellent commutator can be obtained maintenance free and has a high reliability and a long service life while inhibiting sparks causing electric noise.

Furthermore, by providing the structure to integrate a insulative segment, resulting in a both capacitor effect and an insulation characteristic with conductive segments placed in a commutator which is, so that the commutator thus has conductive segments and insulating segments, a separate space for locating the capacitors and wiring to connect the capacitors can be eliminated, so that the configuration of the commutator does not need to be changed in order to provide for the necessary capacitance. The dielectric voltage generated between the brush and a rectifying element when rectification terminates can be inhibited, so as to provide a maintenance free, high reliability, long service life commutator which is free of electric noise. Also minimized is loss of commutator surface due to the time of operation, rectification failure and abnormal abrasion.

DETAILED DESCRIPTION

Embodiments of the present invention will now be described in detail, by way of example, with reference to the accompanying drawings in which:

FIG. 6 shows a commutator according to a second embodiment of the present invention having a central ring of insulating material;

FIG. 17 shows a commutator according to an twelfth embodiment of the present invention;

Figure 18A:
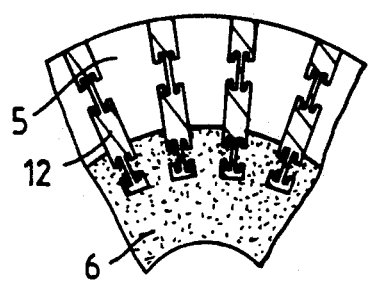
Figure 18B:
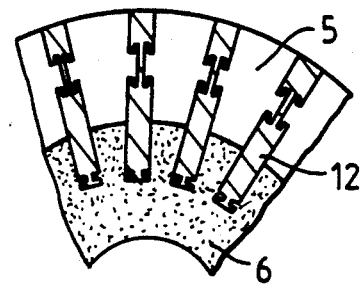
Figure 18C:
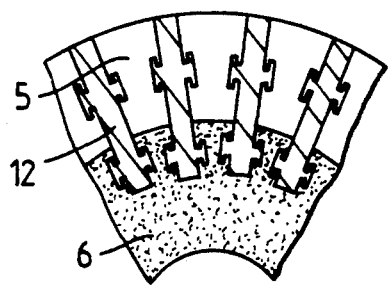
Figure 18D:
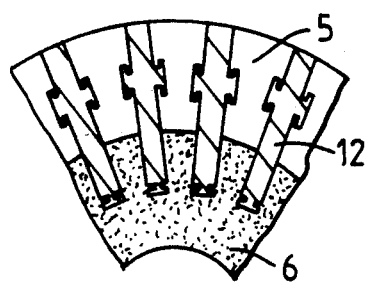
Figure 19:
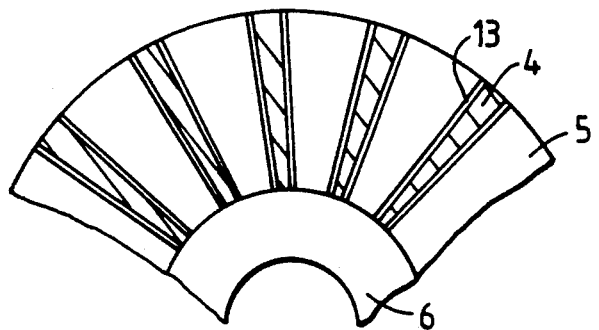

FIGS. 18a-d show a modification to a commutator according to the present invention; and FIG. 19 shows a further modification of a commutator according to the present invention.

DETAILED DESCRIPTION

Embodiment 1

Figure 1:
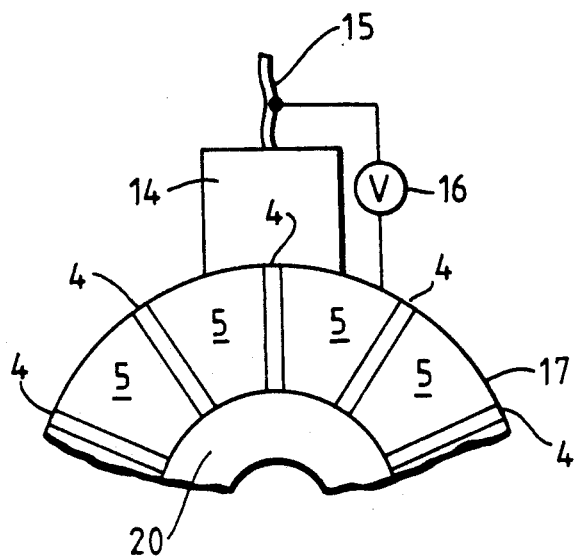
FIG. 1 shows a schematic view of a commutator and brush which form a first embodiment of the present invention.

Referring first to FIG. 1, a commutator has alternate insulating segments 4 made of insulating material and conductive segments 5 made of conductive material which are disposed around a central support 20 provided on a central shaft 21 of a motor shown in FIG. 6. In the arrangement shown in FIG. 1, a brush 14 moves along the outer surface 17 of the commutator, and a voltage line 15 applies a voltage 16 between the brush 14 and the commutator.

Figure 2:
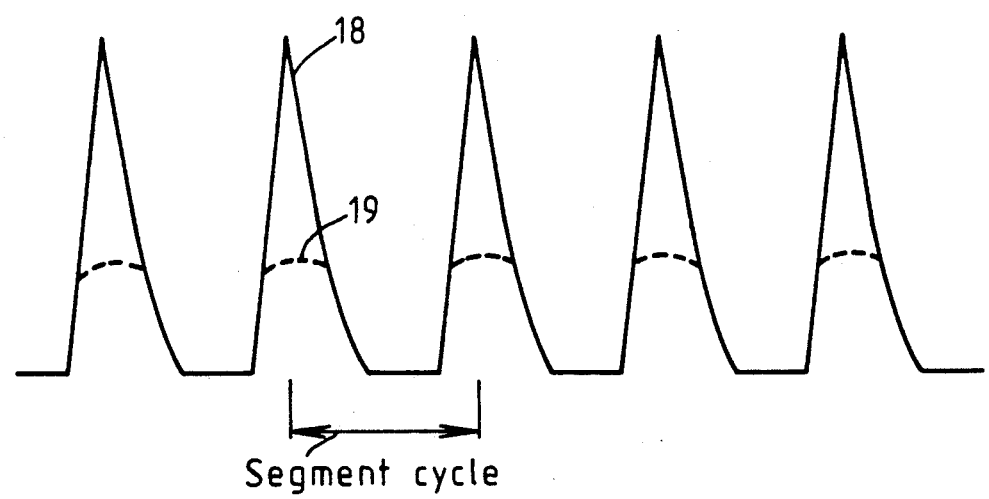
FIG. 2 shows current wave forms.

If the insulative segments 4 and conductive segments 5 are made of normal materials, the contact voltage 16 exhibits sharp peaks 18, as can be seen from FIG. 2.

Therefore, the present invention proposes that the insulative segments 4 have a dielectric constant $\epsilon$, area and thickness which is sufficient to suppress the peaks 18, resulting in a wave form corresponding to dotted line 19. The use of suitable values of dielectric constant $\epsilon$, area and thickness permit a capacitor of suitable capacitance to be formed between the conductive segments 5, as will be described in more detail later.

The production of such a commutator, using ceramic materials, will now be described.

In order to produce of conductive material, metallic Si powder having an average diameter of 1μ and conductive ceramic powder (of nitride or carbide) are mixed and then 20% by volume of organic binders, such as polyethylene base wax and stearic acid are added to that mixed powder as a molding binder. The result is kneaded at a temperature of 150° C. for three hours by a kneader. Then powder for molding material is obtained by crushing the kneaded substance. Similarly, an insulative ceramic is produced by mixing metallic Si powder having an average diameter of 1μ and insulating ceramic powder (oxide, dielectric substance) are mixed and then kneaded using the above mentioned molding binder, and finally, a powder for the moulding material is obtained by crushing the kneaded substance. A mould is filled with these powders and pressed under a pressure of 100 MPa and temperature of 160° C. so as to produce a specimen for measurement. The mixed powder containing molding binder softens as it is heated so that the powder filling rate exceeds 65 vol %.

The resultant molding is heated in an argon atmosphere with the rate of heating being 3° C./h, until a temperature of 500° C. as to remove molding binder, and is then heated in a nitrogen gas atmosphere, step by step up to 1,300° C. to nitride metallic Si, so that a conductive/insulating ceramic sintered body bound by $Si_3N_4$ is obtained. As examples of the above elements, the characteristics of sintered substances obtained by adding TiN, ZrN to conductive ceramic powder and $Al_2O_3$ to insulating ceramic powder are summarized below.

Figure 3:
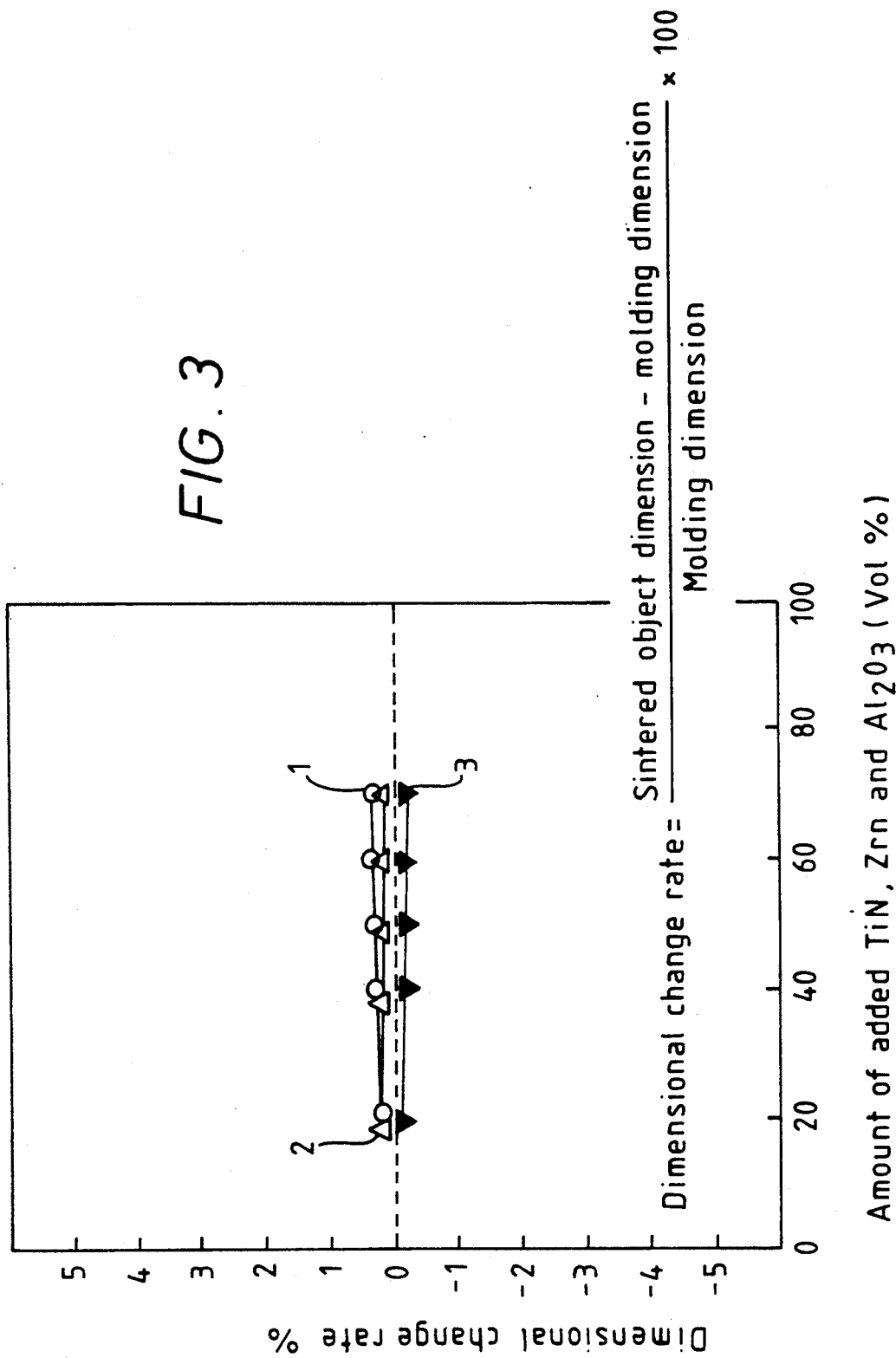
FIG. 3 shows the effect changes in dimensions when a conductor and an insulator are simultaneously sintered.

FIG. 3 shows the dimensional change rate at a sintering stage. The dimensional change rate when sintering with conductive and insulating ceramic powder added is below 0.3% and far smaller than that which occurs with a conventional pressureless sintering method. When Si is heated in nitrogen gas, there is a vapor phase reaction producing $Si_3N_4$, which fills cavities in a dewaxed body (when Si changes to $Si_3N_4$, the volume expands by about 23%, filling cavities and holes in the dewaxed body) and forming a sintered body while reacting with the surface of added conductive or insulating ceramic powder. Consequently, a high density, high strength ceramic with a small dimensional change is obtained.

Figure 4:
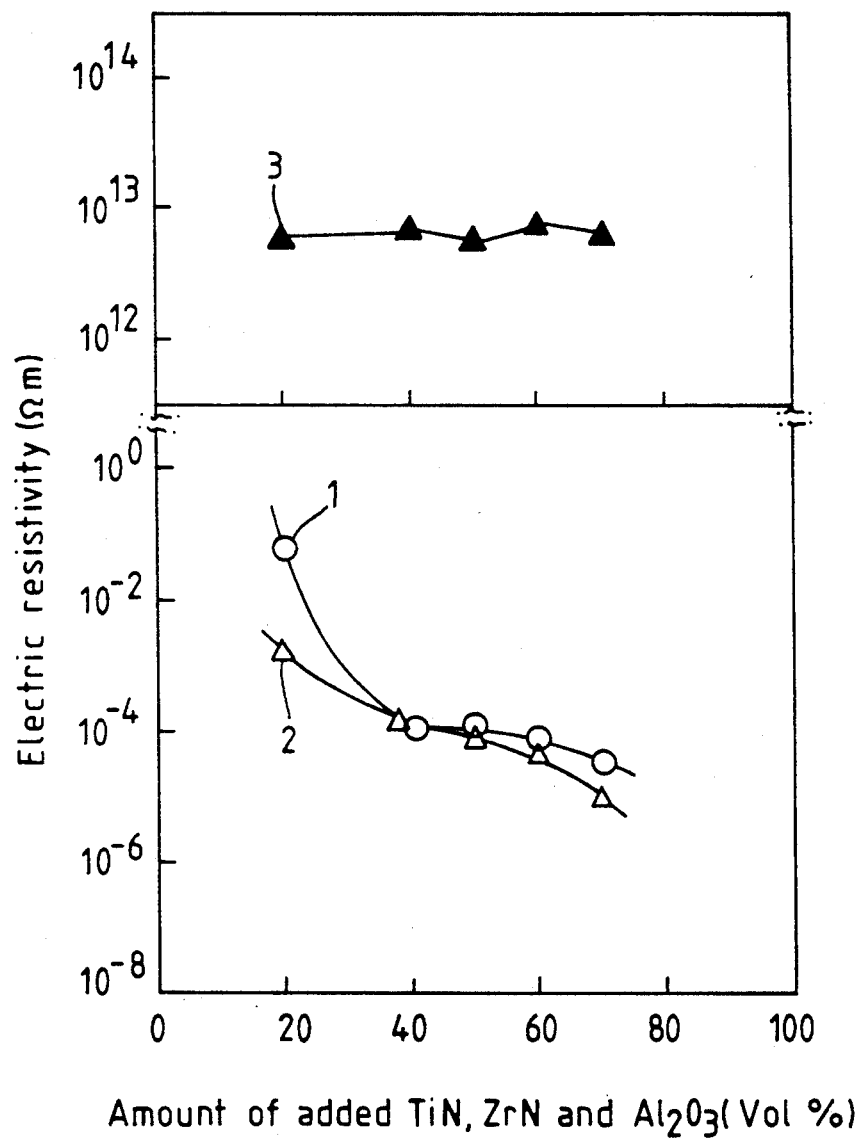
FIG. 4 shows the electric resistivity of sintered conductive and insulated materials.

FIG. 4 shows the resistance of sintered bodies. Conductive ceramics to which conductive ceramics powder have been added have decreased resistance as the amount of the additive increases. The resistance of such a sintered body to which 70 vol % TiN or ZrN has been added is of the order of $10^{-5}$ μm, indicating that it is suitable for use in the conductive segments of the commutator of FIG. 1.

The resistance of a sintered body to which insulating ceramic powder has been added is about $10^{12}$ μm order which is a large value as insulation resistance, so that it is suitable for use as the material for the insulating segments 4 of the commutator of FIG. 1.

Figure 5:
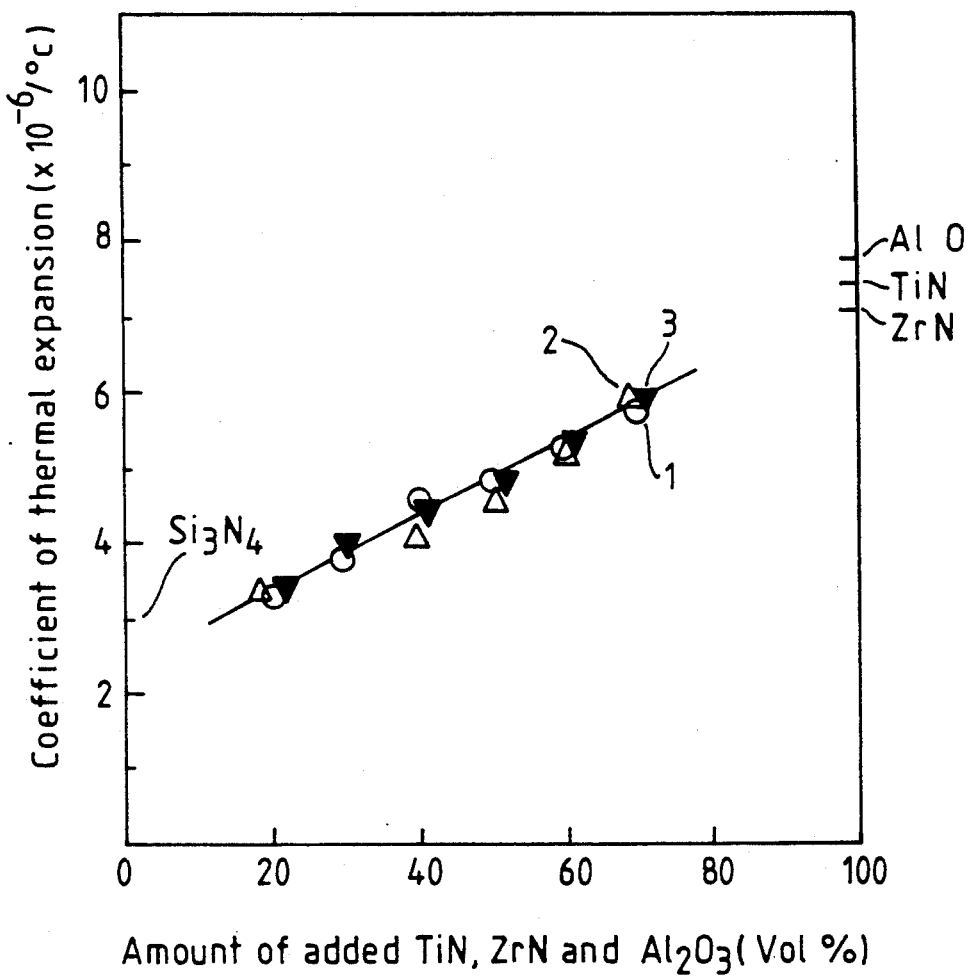
FIG. 5 shows the thermal expansion of sintered conductive and insulative material.

FIG. 5 shows the coefficient of thermal expansion of a sintered body. The coefficient of thermal expansion of a sintered body is almost a straight line connecting matrix $Si_3N_4$ with the coefficient of thermal expansion of each added element, and the coefficients of thermal expansion of a conductor and insulator can be matched by optimizing the amount of additive used. The matrix of conductive ceramics and insulating ceramics is $Si_3N_4$ and the $Si_3N_4$ of the conductor and insulator bind with each other, so that the conductive and insulating materials may be simultaneously sintered ("co-fired"). Consequently there is no risk of crazing or cracking upon sintering because both coefficients of thermal expansion are equal. For the reason, even if a sintered commutator is heated during operation, no roughness is produced on the surface of the commutator. Hence, excellent rectification may be maintained because the coefficients of thermal expansion of the insulative and conductive segments 4,5 are equal.

Most ceramic insulating materials have a dielectric characteristic, and high dielectric materials include titanium oxide, niobium oxide and tantalum oxide materials. However, these materials cannot normally be used directly for the material of commutator insulating segment 4. This is because the production methods and sintering methods of these materials differ, so problems may occur due to contraction upon sintering and bonding to the conductive material when co-firing with a conductive segments. For this reason, a strong dielectric material is powdered, mixed with Si powder, and sintered as described above. This sintered substance matrix is $Si_3N_4$ and the coefficient of thermal expansion can be adjusted by the addition of a suitable amount of dielectric substance, thereby making possible confirming .of the dielectric substance. Although the material to which dielectric substance is added has a smaller dielectric constant as compared with a purely dielectric substance, it has a higher dielectric constant than other insulating materials.

Thus, by use of a suitable material to form the insulative segments 4, those segments 4 may act as capacitors between the conductive segments 5. By suitable selection of the dielectric constant, the area (in a plane radial of the commutator, i.e. perpendicular to the plane of the paper in FIG. 1) and the thickness (in the circumferential direction i.e. in the plane of the paper in FIG. 1), the capacitance of the capacitor may be selected to have a suitable value. The capacitance C is given by the following equation:

$$C = \frac{k\epsilon A}{D}$$

where
K is a constant
ε is the dielectric constant of the material
A is the area, and
D is the thickness.

As has already been mentioned, the particular value of capacitance C which is desirable for a given device such as a motor is not derivable theoretically, and must be obtained on an empirical basis. In practice, and according to the present invention, the dielectric constant ε should be at least 10, more preferably at least 20. From the equation above, it would also seem possible to increase the capacitance by decreasing the thickness D of the capacitor formed by each insulative segment 4. In practice, however, if the thickness D is reduced below a limit which again depends on circumstances (including the voltage applied to the commutator) it may cease to have a suitable insulating effect and thus the commutator will not operate. Furthermore, for some purposes, a capacitance C which is too high will also prevent the commutator operating and therefore there is normally a range of capacitance which is suitable.

These factors are illustrated in Table 1 which shows the effect of various values of dielectric constant ε, area A and thickness D. The values shown in Table 1 were derived based on measurements on an electric drill with a ceramic commutator. The conductive segments of the commutator were of $TiN.Si_3N_4$ and the material of the insulative segments was varied as shown in Table 1. The commutator had segments, arranged as shown in FIG. 1, and the commutator had an outer diameter of 30 mm. The drill was rated at 200 V and 1 kW, and the noise measurement was carried out at 1 m.

Furthermore, as mentioned above, many different insulating ceramic materials may be used to form the insulative segments 4. In general, these materials will be chosen so that they have a high dielectric constant ε. However, as mentioned earlier, it may be necessary to mix these materials with a matrix of $Si_3N_4$ in order to achieve suitable binding to the material of the conductive segments 5. Suitable materials of high dielectric constant ε are shown in Table 2.

TABLE 1

| Insulative segment material | Dielectric Constant | Thickness of insulative segment (μm) | Electric noise at 30 MHz (dB) | Insulation | Evaluation |
|---|---|---|---|---|---|
| $3Al_2O_3.2SiO_2$ | 6 | 30 | not measured | Broken | X |
|  |  | 100 | 70 | OK | X |
|  |  | 300 | 90 | OK | X |
|  |  | 500 | 93 | OK | X |
|  |  | 1000 | 100 | OK | X |
| $Al_2O_3$ | 9 | 30 | not measured | Broken | X |
|  |  | 100 | 71 | OK | X |
|  |  | 300 | 86 | OK | X |
|  |  | 500 | 92 | OK | X |
|  |  | 1000 | 97 | OK | X |
| $TiO_2.ZnO$ | 10 | 30 | not measured | Broken | X |
|  |  | 100 | 58 | OK | O |
|  |  | 300 | 85 | OK | X |
|  |  | 500 | 90 | OK | X |
|  |  | 1000 | 95 | OK | X |
| $TiO_2.MgO$ | 19 | 30 | not measured | Broken | X |
|  |  | 100 | 50 | OK | O |
|  |  | 300 | 63 | OK | O |
|  |  | 500 | 80 | OK | X |
|  |  | 1000 | 92 | OK | X |
| $CaTiO_3$ | 150 | 30 | not measured | Broken | X |
|  |  | 100 | 43 | OK | O |
|  |  | 300 | 47 | OK | O |
|  |  | 500 | 49 | OK | O |
|  |  | 1000 | 52 | OK | O |
| $Si_3N_4.BaTiO_3$ | 1000 | 30 | not measured | Broken | X |
|  |  | 100 | 42 | OK | O |
|  |  | 300 | 40 | OK | O |
|  |  | 500 | 42 | OK | O |
|  |  | 1000 | 41 | OK | O |
| $BaTiO_3$ | 1500 | 30 | not measured | Broken | X |
|  |  | 100 | 41 | OK | O |
|  |  | 300 | 42 | OK | O |
|  |  | 500 | 42 | OK | O |
|  |  | 1000 | 42 | OK | O |

Note: Electric noise under 65dB is acceptable for commercial use

TABLE 2

| Material | Dielectric Constant of Materials Dielectric Constant at 1 MHz | |
|---|---|---|
| $3Al_2O_3.2SiO_2$ | 6 | not suitable for this invention |
| BeO | 7 |  |
| $Al_2O_3$ | 9 |  |
| AlN | 9 |  |
| $Si_3N_4$ | 9 |  |
| $TiO_2.ZnO$ (67 wt %) | 10 | suitable for this invention |
| $TiO_2$ | 94 |  |
| $TiO_2.MgO$ (20 wt %) | 16 |  |
| $TiO_2.MgO$ (43 wt %) | 19 |  |
| $TiO_2.BaO$ (28 wt %) | 37 |  |
| $TiO_2.BaO$ (39 wt %) | 44 |  |
| $TiO_2.BaO$ (46 wt %) | 95 |  |
| $TiO_2.BaO$ (56 wt %) | 900 |  |
| $TiO_2.BaO$ (66 wt %) | 1500 |  |
| $La_2O_3.2TiO_2$ | 35 |  |
| $Bi_2O_3.2TiO_2$ | 105 |  |
| $CaTiO_3$ | 150 |  |
| $SrTiO_3$ | 270 |  |
| $MgTiO_2.CaTiO_3$ | 30 |  |
| $SrTiO_2.CaTiO_3$ | 270 |  |

Although the basic structure of the capacitor has a dielectric substance sandwiched between two conductive plates, the commutator has the structure that an insulator is sandwiched between conductors. By using a mixed ceramic composed of $Si_3N_4$ and a dielectric substance, a commutator equipped with a series of capacitors is obtained. On the other hand, the capacitance of each capacitor cannot be determined at a particular value because the optimum capacitance differs depending on the specification of the rotating machine. It is necessary to determine the specific capacitance which absorbs the voltage induced upon rectification in dependence on the characteristics of the rotating machine.

Therefore, using the materials and production method mentioned above enable the production of a ceramic capacitor equipped with a capacitor.

Embodiment 2

In a standard commutator according to the invention, a conductor (copper) and insulator (mica, resin) are arranged alternately on the circumference and an insulating ring is placed in the center. Hence the commutator comprises a conductor and insulator on a central support 20 mounted on a shaft (now shown) (see FIG. 1). A ceramic commutator having such a configuration can be produced by matching the coefficient of thermal expansion of a conductor with that of an insulator when the dimensional change rates upon sintering are small.

To co-fire a conductor and insulator, first, the individual sections 4,5,6 of the commutator are molded and then, the individual parts are located in their respective positions corresponding to the final shape of the commutator, and pressed using a mold at a molding pressure of 100 MPa, and a molding temperature of 160° C. Si and $Al_2O_3$ mixed powder molding arranged on the insulating ring forming the central support and the mixed powder molding of a conductor (mixed powder of Si and nitride or carbide) and insulator (mixed powder of Si and oxide or dielectric substance) placed on the circumference alternately. In this case, the same method as described above may be used to decrease and sinter a molding for production of the commutator. The commutator then obtained has little dimensional change due to sintering and is free of crazing or cracking between the conductor and insulator.

Embodiment 3

The commutator shown in FIG. 6 has almost the same shape as the current commutator and the overall body is made of ceramic. The configuration involves a central support in the form of an insulating ring 6 (ceramic of $Si_3N_4$ and $Al_2O_3$ at the center, and conductive segments 5 a with composite ceramic of $Si_3N_4$ and conductive nitride or conductive carbide) and insulator (mixed ceramics of $Si_3N_4$ and dielectric substance) are arranged alternately around the circumference of the ring. There will normally be a metal shaft 21 within the insulating ring 6. Thus the insulating ring 6 and the metal shaft 21 form the central support 20.

The configuration of a ceramic commutator represented above has a composite ceramic of $Si_3N_4$ and dielectric substance sandwiched by conductors, which serves as a capacitor, and therefore this is a commutator containing capacitors.

In FIG. 6, the material of the insulating ring 6 which surrounds the central shaft 21 is preferably different from that forming the insulative segments 4. The reason for this, as has been mentioned previously, is to prevent currents from flowing between the central shaft 21 (normally conductive) and the conductive segments 5. The alternating voltage applied between the central shaft 21 and the conductive segments 5 may have high frequency ripples thereon, and these ripples may cause a current to flow if a capacitor is formed by the material of the insulating ring 6 between the central shaft 21 and the conductive segments 5. Therefore, the dielectric constant $\epsilon$ of the material forming the insulating ring 6 should be small, preferably 10 or less. It is also desirable that the resistivity of the material forming the insulating ring 6 is greater that the resistivity of the material forming the insulating segments 4.

Embodiment 4

The optimum capacitance of the capacitors of a commutator according to the present invention differs depending on the requirements of a rotating machine. Since the conductor and insulator are arranged in the circumferential direction of the commutator in commutator segments, the commutator shape is determined by the commutator diameter and resistance of the conductor, and consequently, it is difficult to determine a suitable capacitance of the capacitors as determined by the shape of the insulating segments 4. If the capacitance of the capacitors is determined by the shape of the insulating segments, the volume of each conductive segment decreases, so that the resistance of the conductive material shown in FIG. 4 may not allow the required current to flow, thereby reducing the performance. Then, to adjust the capacitance of the capacitors corresponding to the function of the commutator, the capacitor is designed by considering the length of commutator segment and the location of the segment. A commutator shape allowing selection of capacitor capacity is shown below.

Figure 7:
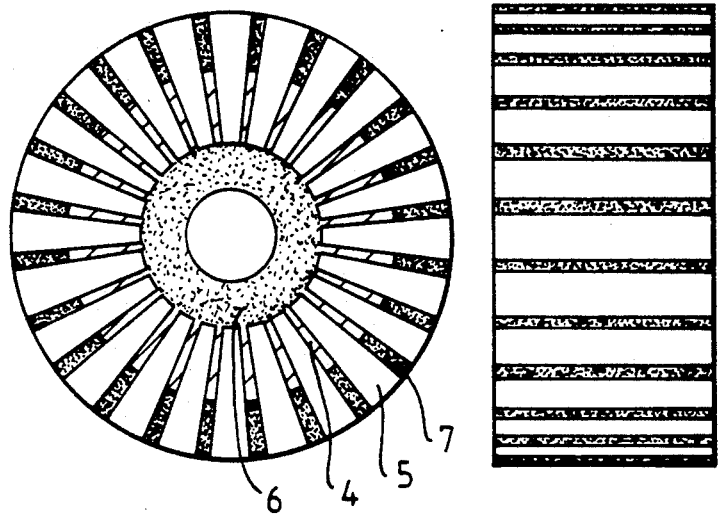
FIG. 7 shows a commutator according to a third embodiment of the present invention, also having a central ring of insulating material.

In the commutator shown in FIG. 7, an insulating ring 6 (composite ceramics of $Si_3N_4$ and $Al_2O_3$) is placed at the center and conductive segments (composite ceramics of $Si_3N_4$ and conductive nitride or conductive carbide) are arranged around the circumference of the insulating ring 6. A composite ceramic of $Si_3N_4$ and dielectric substance is arranged between adjacent conductive segments with a shorter length (in the radial direction) than the conductive segments while segments 7 of insulating ceramic composite (ceramic of $Si_3N_4$ and $Al_2O_3$) are arranged between the conductive segments 5 outwardly of the dielectric substance. As a result, the insulative segments 4 do not extend to the outer periphery of the commutator, but instead their length in the radial direction is determined so that they have an area A which is selected to give a satisfactory capacitance C, taking into account their dielectric constant $\epsilon$ and thickness in the circumferential direction. The insulating ceramic 7 will have a lower dielectric constant 6 than the insulative segments 4, so that it does not give a capacitive effect.

The capacitance of the capacitors is determined so as to fit the shape of a commutator corresponding to a rotating machine by adjusting the length of mixed ceramic segment 7 of $Si_3N_4$ and the dielectric substance formed by insulative segments 4.

Figure 8:
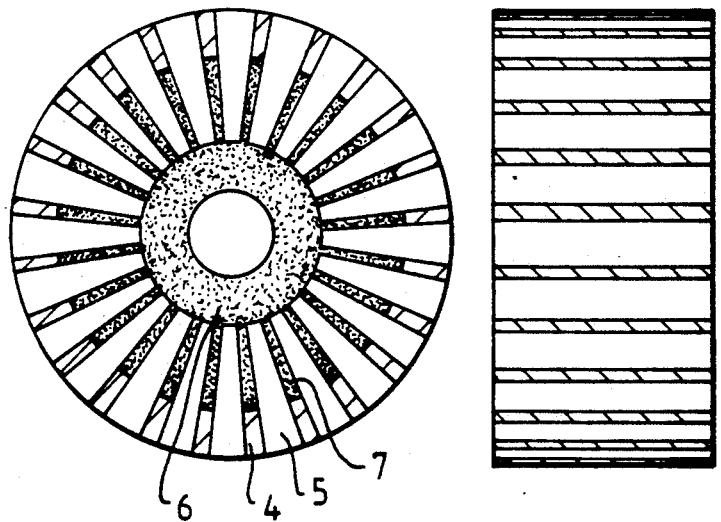
FIG. 8 shows a commutator according to a fourth embodiment of the present invention.

In FIG. 8, an insulating ring 6 (composite ceramic of $Si_3N_4$ and $Al_2O_3$) is placed at the center and conductive segments 5 (composite ceramic of $Si_3N_4$ and conductive nitride or conductive carbide) are arranged on the circumference and segments 7 of insulating ceramic (composite ceramic of $Si_3N_4$ and $Al_2O_3$) are sandwiched between adjacent conductive segments 5 with a shorter length than the conductive segments 5 while a mixed ceramics of $Si_3N_4$ and dielectric substance is arranged in the remaining parts to form insulative segments 4.

In the embodiment of FIG. 8, the segments 7 are preferably of the same material as the insulating ring 6. Thus, this embodiment may be considered as equivalent to one in which the central ring has a large diameter, (i.e. the segments 7 are considered part of the central ring), and the conductive segments 5 then extend into the central ring 6.

The capacitance of the capacitors is determined so as to fit the shape of a commutator corresponding to a rotating machine by adjusting the lengths of mixed component segments 7 of $Si_3N_4$ and dielectric substance formed by insulative segments 4 at circumference of the commutator.

Figure 9:
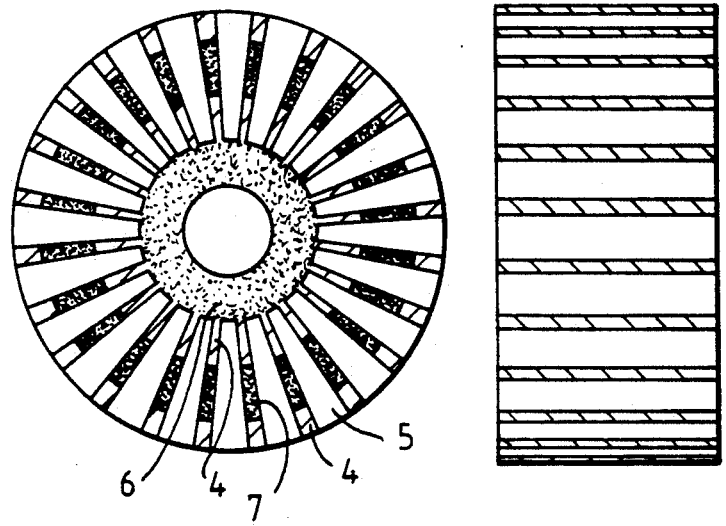
FIG. 9 shows a commutator according to a fifth embodiment of the present invention.

FIG. 9 shows a commutator which is a combination of FIG. 7 and FIG. 8, and composite ceramic of $Si_3N_4$ and dielectric substance are arranged on the circumference of the center insulating ring 6 and at the periphery of the commutator. Thus, in this embodiment the insulative segment 4 is not continuous from the insulating ring 6 to the circumference of the commutator, but is interrupted by segments 7 of insulating ceramic of lower dielectric constant $\epsilon$.

The capacitance of the capacitor is determined so as to fit the shape of a commutator corresponding to a rotating machine by adjusting the length of the parts of the segments 4 of composite ceramics of $Si_3N_4$ and dielectric substance arranged near the center and at the circumference of the commutator.

Figure 10:
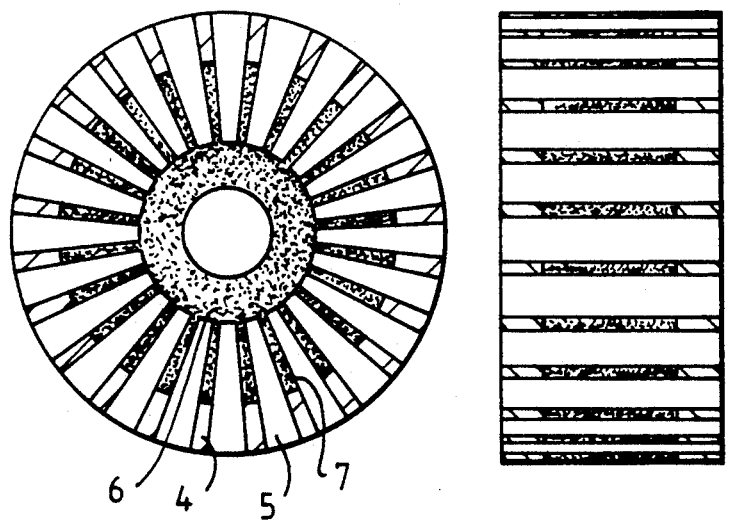
FIG. 10 shows a commutator according to a sixth embodiment of the present invention.

A further embodiment is shown in FIG. 10, in which the axial length of the insulative segments 4 of dielectric material does not correspond to the axial length of the conductive segments 5. Instead, the material of the insulative segments 4 of dielectric material of high dielectric constant $\epsilon$ ($\epsilon$ greater than 10) exists only at the axial ends of the gaps between the conductive segments 5, and the central region contains segments 7 of insulating ceramics (composite ceramics e.g. those materials discussed earlier) of lower dielectric constant $\epsilon$.

Again, this alternative enables the capacitance of the capacitors formed by the insulative segments 4 of suitable dielectric material to be selected in dependence on the rotating machine in which the commutator is to be used. In the embodiment of FIG. 10, the insulative segments 4 of dielectric material are also limited in the radial direction, so that the segments 7 of insulating ceramics extend to the axial ends of the commutator adjacent the insulating ring 6.

Embodiment 5

Figure 11:
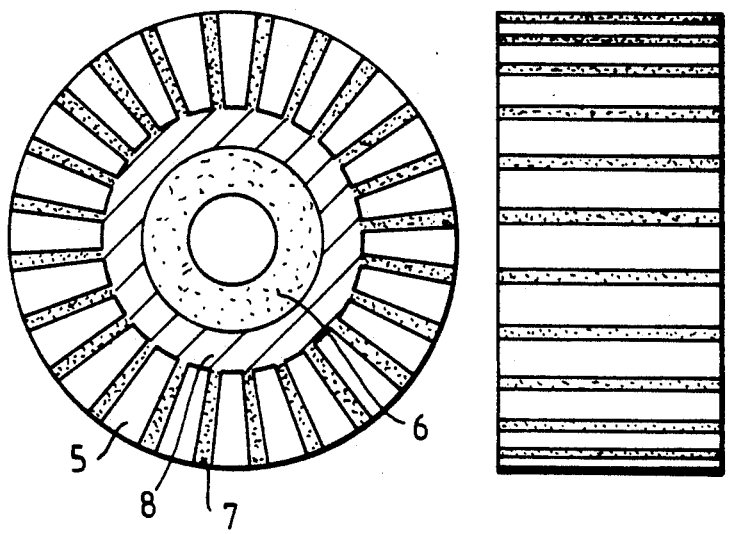
FIG. 11 shows a commutator according to a seventh embodiment of the present invention on which a central insulating ring forms capacitors.

In the commutator shown in FIG. 11, a ring 8 of composite ceramics of $Si_3N_4$ and dielectric substance surrounds the circumference of an insulating center ring 6 (composite ceramics of $Si_3N_4$ and $Al_2O_3$) and further a conductive segments 5 (composite ceramics of $Si_3N_4$ and conductive nitride or conductive carbide) and insulating segments 7 (composite ceramics of $Si_3N_4$ and $Al_2O_3$) are arranged alternately around the circumference of centre ring 6.

Thus, the embodiment of FIG. 11 does not form capacitors for depressing current pulses by the use of insulative segments of suitable dielectric constant between the conductive segments. Instead, insulative material of suitable dielectric constant $\epsilon$ (e.g. $\epsilon$ greater than 10, preferably greater than 20) forms the ring 8 radially inwardly of the conductive segments 5. Therefore, that ring 8 forms a capacitor between each pair of conductive segments, which gives a similar effect to that of embodiments described previously.

With the embodiments of FIG. 11, the diameter thickness of the composite ceramic ring 8 of $Si_3N_4$ and dielectric substance is determined to give capacitances between the conductive segments 5 which is sufficient to suppress current pulses in the particular rotating machine for which the commutator is intended.

Figure 12:
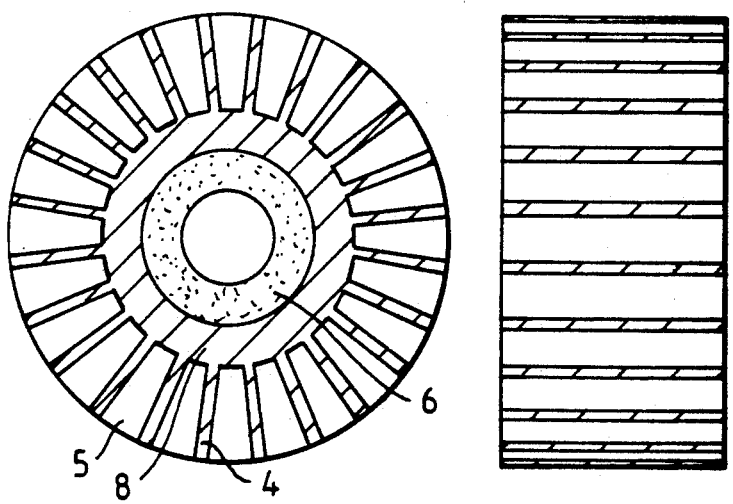
FIG. 12 shows a commutator according to an eighth embodiment of the present invention.

In FIG. 11 the insulating segments 7 have a lower dielectric constant $\epsilon$ (e.g. $\epsilon$ of 10 or less) than the ring 8. Of course, as shown in FIG. 12, it is possible to combine the feature of FIG. 11 and previous embodiments, by providing insulative segments 4 of suitably high dielectric constant $\epsilon$ (made of composite ceramics giving suitable dielectric effect) on the outer periphery of ring 8 of similar material. The embodiment of FIG. 12 then provides a capacitive effect both directly between the conductive segments 5 due to insulative segments 4, but also radially inwardly of the conductive segments 5 due to ring 8.

Again, the dimensions of the insulative segments 4 and ring 8 are selected in order to give a suitable capacitance to the capacitors between the conductive segments 5 in dependence on the electric machine for which the commutator is to be used.

Embodiment 6

Figure 13:
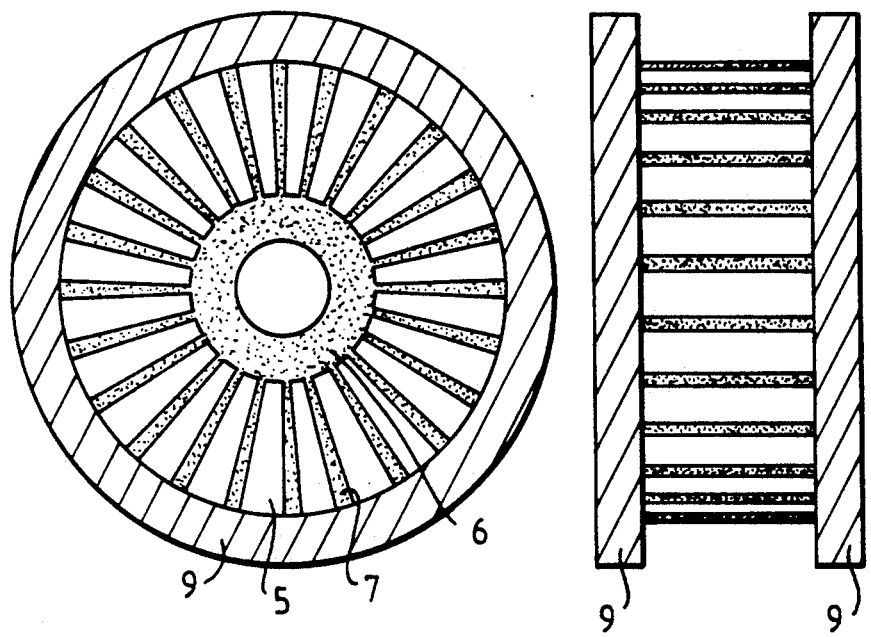
FIG. 13 shows a commutator according to a ninth embodiment of the present invention in which an outer insulating ring forms capacitors.

FIG. 13 shows a further embodiment of the present invention, which is similar to that of FIG. 11 except that the insulative material of suitably high dielectric constant $\epsilon$ is in the form of one or more rings 9 located outwardly of the conductive segments 5. In this embodiment, as illustrated, two such rings 9 are provided at the axial ends of the commutator, but it is also possible for the ring 9 to extend over the full axial length of the commutator.

Thus, in this embodiment, the conductive segments 5 are separated by insulating segments 7 of e.g. the same material as the central ring 6, and the dielectric constant $\epsilon$ of the segments 7 and central ring does not have to be sufficiently large to give a capacitive effect. Instead, that capacitive effect is provided between the conductive segments 5 by the ring 9 of suitably high dielectric constant. The dielectric constant $\epsilon$ of this material is at least 10, preferably 20 or more.

Figure 14:
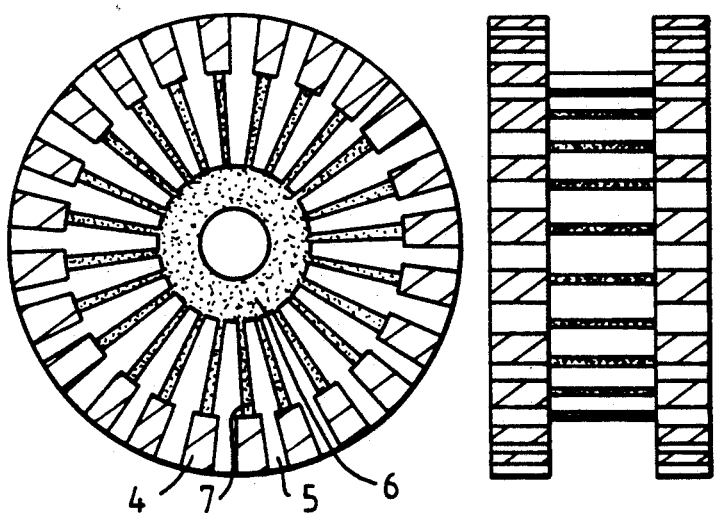
FIG. 14 shows a commutator according to a tenth embodiment of the present invention.

In the embodiment of FIG. 13, the materials used to form the various segments and the ring 9 may be the same as in earlier embodiments. Furthermore, the dimensions of the ring 9 are chosen to give a suitable capacitance to the capacitors formed. In the embodiment of FIG. 14, the use of rings at the axial ends of the commutator is modified so that those rings comprise segments of conductive material 5 and segments of insulative material 4 of suitable high dielectric constant $\epsilon$. Thus, the embodiment of FIG. 14 may be considered to be equivalent to the embodiment of FIG. 10, but with the segments 7 not extended to the periphery of the commutator. Alternatively, this embodiment may be considered as one in which there are one or more rings each comprising a plurality of conductive segments 5 and a plurality of insulative segments 4 arranged alternately, on a central support consisting of central ring 6, insulating segments 7, and conductive segments 5. Again, the dimensions of the insulative segments 4 are selected to get the appropriate capacitance, and similar materials may be used as described previously.

Embodiment 7

Figure 15:
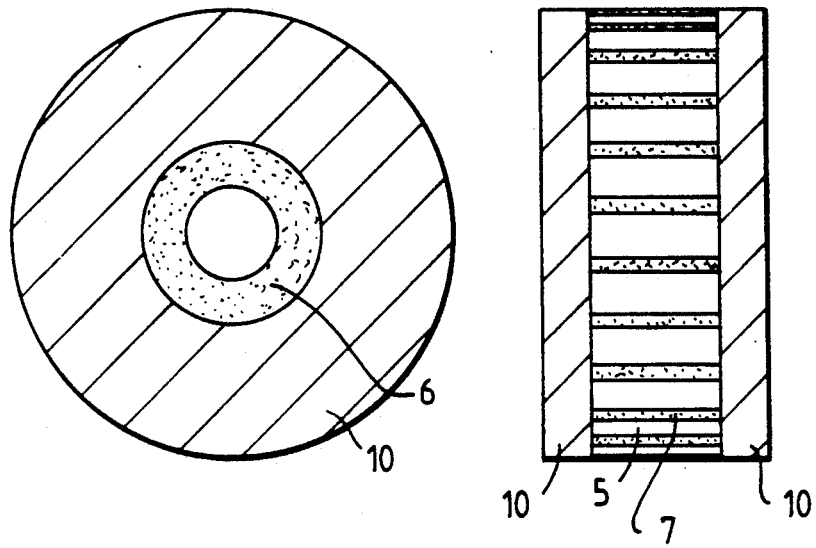
FIG. 15 shows a commutator according to an eleventh embodiment of the present invention in which a plate of insulative material forms capacitors.

The embodiment shown in FIG. 15 modifies the embodiment of FIG. 13 by placing plates of insulative material of suitably high dielectric constant $\epsilon$ at the axial ends of the commutator. The plates may be in the form of an annular section 10, so that the central insulating ring 6 extends to the axial ends of the commutator. Alternating segments 5,7 of conductive and insulating material are located between the annular plates 10. In this embodiment, suitable capacitors between the conductive segments 5 are provided at the axial ends of the commutator due to annular plates 10 rather than directly between the conductive segments 5 as in e.g. the embodiment of FIG. 4, or radially inwardly or outwardly as in the embodiments of FIGS. 11 and 13.

The dimensions of the annular plates 10 may be selected in dependence on the purpose of the commutator, and similar materials to those described earlier may be used.

Figure 16:
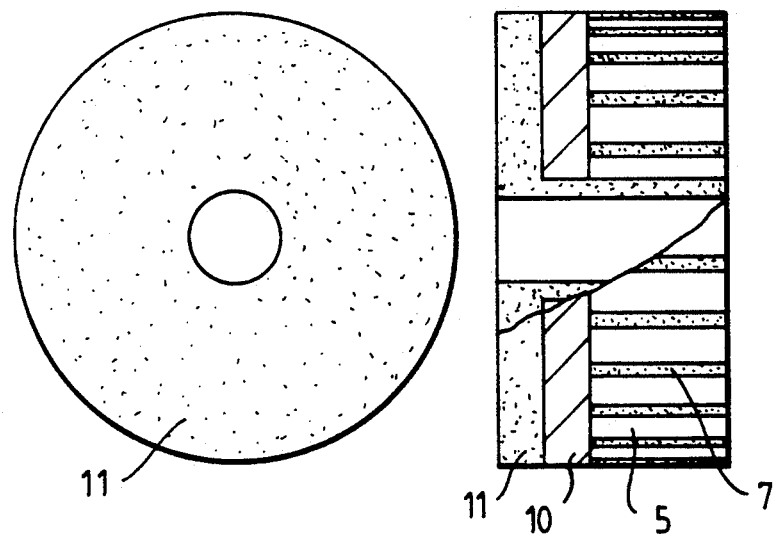
FIG. 16 shows a modification of a commutator of FIG. 15.

FIG. 16 shows a modification of the embodiment of FIG. 15 in which the central ring 6 is extended into an axial plate 11 with one end of the commutator, thereby covering the axial end of the annular plate 10. Again, similar materials may be used.

Embodiment 8

FIG. 15 shows a shape of the commutator whose insulative segments 4 arranged between conductive segments 5 is such that the commutator has grooves 22 on its outer surface, i.e. the insulative segments 4 do not extend to the outer surface. The commutator 4 is electrically short-circuited by carbon powder when carbon particles from the carbon brush adhere to the insulative segments 4 when the commutator is rotating. Hence, the embodiment of FIG. 15 avoids this.

However, when the insulating segments 4 (of the composite ceramic of $Si_3N_4$ and dielectric substance) between the conductive segments 5 do not extend to the outer surface of the commutator, the end face of the conductive segments adjacent the grooves 22 has a sharp angle so that the carbon brush may be greatly worn when it contacts this edge. Thus the end face of the conductive segments 5 may be chamfered or rounded.

This idea of providing grooves on the outer surface of the commutator may be applied to other embodiments.

Commutators, according to the embodiments discussed above may be produced by the slip casting method, the rubber press method, the CIP method, the HIP method and the extrusion molding method as alternatives to the pressing method described in detail above.

Embodiment 9

The insulating segment of the co-fired commutator discussed above may be produced using an insulator containing added dielectric powder. In this case, the dielectric constant is lower than that of the dielectric substance itself. For the reason, such a commutator whose segment has a larger dielectric constant is produced. First of all, a segment having a high dielectric constant is produced by sintering and a molding for the conductor is produced by the method of embodiment 2, and then with the sintered insulator and molded conductor set in a mold, that commutator is produced by molding according to the method of embodiment 2. The segment having a high dielectric constant is not deformed despite the applied pressure because it is sintered. Thus the conductive material is molded longer than the segment having a high dielectric constant so that only the conductive segments are deformed when pressurized.

Although the conductive segments are softened by heat and integrated upon molding, it is not easy for them to be coupled to the insulative segments, so that there is a danger that the commutator will break up when the commutator rotates at high speed. Thus, the segments 12 having a high dielectric constant may be given protrusions and or indications as shown in FIGS. 18(a) to 18(d) to facilitate coupling to the conductive segment 5. FIGS. 18(a) and (b) illustrate coupling using indentations, and FIGS. 18(c) and (d) illustrate coupling using protrusions. FIGS. 16(a) to (d) also show alternative ways of coupling the insulative segments 12 to the central ring 6. The arrangement of FIG. (a) achieves this by indentations the arrangement of, FIG. 18(c) by protrusions, and the arrangements of FIGS. 18(b) and (d) by a "T"-shaped part at the end of the insulative segments 12.

Thus, if the conductive segments 5 are pressurized when softened by heating, conductive material is inserted into the protruded/indented part of the insulative segments 12 having a high dielectric constant so as to achieve the coupling, thereby producing an integrated commutator. Because the coefficient of thermal expansion of conductive segments 5,12 can be made to match and insulator, no cracking or crazing occurs at joints despite heating. As a result, even if the coupling force is weak, there is no risk that the commutator will break up at a high speed rotation. Although the difference of thermal expansion between the insulative segments 12 having a high dielectric constant and conductive segments 5 may cause a problem, when BaO TiO$_2$, is used for the insulative segments 12 for example, the coefficient of thermal expansion is about $6 \times 10^{-6}/°C.$, which can be matched by the coefficient of thermal expansion of a conductor as explained in FIG. 3, therefore there is no problem.

Embodiment 10

In addition to the commutator produced by coupling as described above, it is possible to produce another ceramic commutator by integrating conductive segments with insulative segments using adhesive agent. The insulative segments thus have suitably high dielectric constant to form capacitors. The characteristic of this method is that if the capacitors are insulative segments, the characteristic of the capacitors do not deteriorate because there is no need for heating, so that production of such a commutator where a conductor is integrated with a capacitor is enabled.

In bonding ceramic to each other, ceramics base adhesive (for example, alumina base, zirconia base, cermet base, silica base or mixture) is used and the binder of this adhesive agent is phosphate based, which is hardened while organic substance is removed when heated at 300° to 500° C. The heat resistance temperature after bonding is over 1,000° C., which exceeds the heat resistance temperature of the commutator. Because the main component of adhesive agent is ceramic, there is no difficulty with abrasion resistance. On the other hand, the coefficient of thermal expansion of the ceramic adhesive agent can be matched to the coefficient of thermal expansion of the ceramic material because the main component is ceramic, so that when a conductor is bonded to an insulator, no crazing or cracking occurs because there is no difference of thermal expansion. The production method first requires each conductive segment and capacitor segment to be made to a specified shape and coated with adhesive agent, and then set in a case and bonded together by heating while applying a pressure. The characteristic of the capacitors of the commutator do not change from before integration because the heating temperature is low and consequently, a commutator having desired capacitance of capacitors may be produced.

The above description of embodiment 10, assumes that the ceramic is used for the conductor of the commutator to be produced by bonding. However, metal or metal mixed ceramic can be used for the conductor because the bonding temperature is low. The coefficient of thermal expansion of the metal or metal mixed ceramic needs to be matched to that of the insulative material forming the capacitors, and as the metal or metal mixed ceramic to be used for this purpose, a metal, alloy or the metal mixed ceramic having a low resistance and coefficient of thermal expansion needs to be selected.

In addition, paper, organic film and ceramic capacitors can be used.

The capacitance of the capacitors may be determined in a similar way to those shown in FIGS. 6. to 17.

Embodiment 11

In this embodiment, the basic structure of each capacitor involves two conductive plates facing each other with a dielectric substance in between. The structure of the commutator involving sandwiching an insulator between conductors, and a capacitor is obtained by using a mixed ceramic of Si$_3$N$_4$ and dielectric substance as an insulator. Or it is another way to provide a conductor 13 as an electrode between an insulating segment 4 having dielectric characteristic and a conductive segment 5 as shown in FIG. 19. Again, the insulating segment 4 need not be of ceramic and paper or organic film may be used.

Embodiment 12

The commutators shown in FIGS. 6 to 17 are cylindrical and rectify current by pressing a brush against the radially outer face. However, it is also possible to press a brush against the axial face. In the commutators shown in FIGS. 6 to 17, the psrtd 4 to 8 and 12 are usable without change of shape and in FIGS. 11 and 12, the brush needs to avoid contact with the ceramic ring 6 of $Si_3N_4$ and ring 8 dielectric substance provided near the center. In the commutator shown in FIG. 13, the brush needs to avoid the ceramic ring 9 of $Si_3N_4$ and dielectric substance at the circumference of the commutator. In the commutators shown in FIGS. 15 and 16, the annular plate 10 of ceramic of $Si_3N_4$ and dielectric substance or plate 11 must be only on one axial end of the commutator so the brush can contact the other axial end.

Embodiment 13

A commutator produced by incorporating a 3nF capacitor between conductive segments has been compared with the conventional commutator. In a conventional commutator, the electrical noise increases near 30 MHz with the passage of time by at least 20 dB up. When the surface of the tested commutator is observed, the part where a spark occurs is rough and the roughness of the commutator surface leads to generation of noise. On the contrary, a commutator according to the present invention incorporating capacitors produces less noise, undergoes no change with the passage of time and is stable. In addition, it can be established that TV and radio sets are not affected by noise when a commutator according to the present invention incorporating capacitor is started. When the surface of such a commutator is observed, in the same manner as the conventional commutator, it can be established that no roughness is produced on the surface and fewer sparks occur.

Embodiment 14

By inserting an inductance into a commutator according to the present invention incorporating capacitors, generates a spark under the rotation speed of 3,000 rpm and brush current density of 20 A/cm$^2$, a comparison can be made with a conventional commutator. As a result, although the spark from the conventional commutator is grade 7 or 8, the spark from a commutator according to the present invention incorporating capacitors is below half, thereby indicating that the effect of the capacitor is great.

The term "grade" is defined by Japanese Electrotechnical Committee Standards.

If the voltage waveform is observed according to the method shown in FIG. 1, the commutator according to the present invention incorporating capacitors undergoes only a small change of voltage because is absorbed by the capacitor although the waveform of the commutator without such capacitors rises sharply as shown in FIG. 2, causing a violent spark.

The surface of the ceramic commutator where a spark has been generated artificially, still has no roughness, so that there is no deterioration of rectification and the surface of the commutator is not significantly worn. Although the surface of the conductive ceramic receiving a spark may be discolored black, when the roughness on the surface of ceramic commutator before and after a test is measured, no considerable difference exists and no damage is found on the surface of ceramic commutator. When the black discolored section is observed in detail, the black described section is found that it corresponds to adhering brush carbon. Furthermore it is found that this adhering carbon improves the sliding of the brush, and inhibits the abrasion of a carbon brush, thereby preventing the abrasion of a carbon brush due to the combination of a hard ceramic and carbon. This test condition is severe, and rectification under normal voltages and currents produces a better result.

Because capacitors are formed by the insulative segments of a commutator according to this invention, this inhibits generation of a spark and reduces electric noise causing radio disturbance, the roughness of the commutator surface may be reduced or eliminated, extending the service life.

Applying ceramic to all the materials of a commutator ensures heat resistance, abrasion resistance and light weight. Ceramic is a non-combustible (high fusing point) material and is unlikely to be melted by an arc as compared with the conventional conductive segment (copper), undergoing less roughness of the surface. When ceramic slides against a graphite brush, although the abrasion of the graphite brush might be predicted from the hard ceramic material; however the graphite brush is highly resistant to abrasion it is found that, graphite adheres to the surface of the commutator, thereby improving the sliding of the brush and reducing the abrasion of the brush. The density of ceramic itself is about ⅓ copper, conventional material. Thus, if copper is used as the material of a rotating machine, when the rotation of the machine is stopped after a high-speed rotation, inertia acts because the commutator is itself heavy. In this case, the wiring connected to the rotor may be twisted causing the risk of disconnection or slip-out of the commutator fixture. However, a commutator made of ceramic as proposed in this invention may be light weight, eliminating or reducing this risk. On the other hand, integrating a ceramics conductor with a ceramics capacitor enables to supply a compact structured product to be produced cheaply without further adding a capacitor mounting location and bonding process.

What is claimed is:
1. A commutator comprising:
   a central support;
   a plurality of conductive segments; and
   a plurality of insulative segments, said conductive segments and said insulative segments being arranged alternately around a circumference of said central support;
   wherein each of said plurality of insulative segments has a dielectric constant which is greater than 10 and has an area of a surface in a plane in a radial direction to said central support and a thickness in a circumferential direction of said central support such that the insulative segments suppress current peaks during an operation of said commutator.

2. A commutator according to claim 1, wherein said dielectric constant is at least 20.

3. A commutator according to claim 1 wherein said conductive segments are of a first ceramic material.

4. A commutator according to claim 1 wherein said insulative segments are of a second ceramic material.

5. A commutator according to claim 1, wherein each of said insulative segments includes $Ti\ O_2$.

6. A commutator according to claim 1, wherein each of said insulative segments includes $Ba\ Ti_x\ O_y$.

7. A commutator according to claim 1, wherein said central support is made of an insulating material different from the material of said insulative segments.

8. A commutator according to claim 1, wherein each of said insulative segments has a resistivity of at least $3 \times 10^5$ $\Omega m$.

9. A commutator according to claim 1, wherein each of said conductive segments has a resistivity not greater than $3 \times 10^{-4}$ $\Omega m$.

10. A commutator according to claim 1, wherein said central support is made of an insulating material different from the material of said insulative segments.

11. A commutator according to claim 10, wherein said insulating material of said central support has a dielectric constant less than a dielectric constant of the material of said insulative segments.

12. A commutator according to claim 10, wherein said insulating material of said central support has a dielectric constant greater than a dielectric constant of the material of said insulative segments.

13. A commutator according to claim 10, wherein said insulating material of said central support has a resistivity greater than a resistivity of the material of said insulative segments.

14. A commutator according to claim 10, wherein said central support is provided on a central shaft of a conductive material so as to surround said central shaft.

15. A commutator according to claim 1, wherein each of said insulating segments is made of a first insulative material and wherein at least one body made of a second insulating material interconnects said plurality of conductive segments.

16. A commutator according to claim 15, wherein said at least one body is at least one ring which extends around said central support so as to interconnect said plurality of conductive segments.

17. A commutator according to claim 16, wherein said at least one ring is radially outward of said plurality of conductive segments around the circumference of said central body.

18. A commutator according to claim 16, wherein said at least one ring is radially inward of said plurality of conductive segments around a circumference of a central shaft.

19. A commutator according to claim 15, wherein said conductive and insulative segments extend along said central support in an axial direction thereof and wherein said at least one body extends to axial ends of said plurality of conductive segments.

20. A commutator according to claim 19, wherein said dielectric constant is at least 20.

21. A commutator according to one of claims 15 to 19 or wherein the body is of a ceramic material.

* * * * *